US009056801B2

(12) United States Patent
Ootsuki et al.

(10) Patent No.: US 9,056,801 B2
(45) Date of Patent: *Jun. 16, 2015

(54) METHOD FOR PRODUCING SLURRY COMPOSITION

(75) Inventors: Kenichi Ootsuki, Shiga (JP); Yuki Hirose, Shiga (JP); Motokuni Ichitani, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 100 days.

This patent is subject to a terminal disclaimer.

(21) Appl. No.: 13/258,634

(22) PCT Filed: Mar. 16, 2010

(86) PCT No.: PCT/JP2010/054380
§ 371 (c)(1),
(2), (4) Date: Nov. 1, 2011

(87) PCT Pub. No.: WO2010/113628
PCT Pub. Date: Oct. 7, 2010

(65) Prior Publication Data
US 2012/0041123 A1 Feb. 16, 2012

(30) Foreign Application Priority Data

Mar. 31, 2009 (JP) .................................. 2009-087143
Apr. 14, 2009 (JP) .................................. 2009-098206

(51) Int. Cl.
| | | |
|---|---|---|
| C08K 5/01 | (2006.01) | |
| C08K 5/05 | (2006.01) | |
| C08L 29/14 | (2006.01) | |
| C04B 35/634 | (2006.01) | |
| C04B 35/26 | (2006.01) | |
| C04B 35/468 | (2006.01) | |
| C04B 35/581 | (2006.01) | |
| C04B 35/626 | (2006.01) | |
| C08J 3/09 | (2006.01) | |
| H01B 1/22 | (2006.01) | |
| H01G 4/12 | (2006.01) | |
| H01G 4/30 | (2006.01) | |

(52) U.S. Cl.
CPC ........... *C04B 35/6342* (2013.01); *C04B 35/265* (2013.01); *C04B 35/4682* (2013.01); *C04B 35/581* (2013.01); *C04B 35/6264* (2013.01); *C04B 2235/3279* (2013.01); *C04B 2235/3284* (2013.01); *C04B 2235/96* (2013.01); *C04B 2235/963* (2013.01); *C08J 3/09* (2013.01); *C08J 2329/14* (2013.01); *C08L 29/14* (2013.01); *C08L 2205/02* (2013.01); *H01B 1/22* (2013.01); *H01G 4/12* (2013.01); *H01G 4/1209* (2013.01); *H01G 4/30* (2013.01)

(58) Field of Classification Search
CPC .... C04B 35/6264; C04B 35/6342; C08J 3/09; C08K 3/08; C08K 3/10; C08L 29/14
USPC ......... 524/401, 413, 428, 435, 501, 503, 315, 524/361, 364, 390
See application file for complete search history.

(56) References Cited

U.S. PATENT DOCUMENTS

| | | |
|---|---|---|
| 2006/0014049 A1 | 1/2006 | Ichinose et al. |
| 2006/0192180 A1* | 8/2006 | Ichitani et al. ................ 252/500 |
| 2007/0262496 A1 | 11/2007 | Frank et al. |
| 2009/0078358 A1 | 3/2009 | Tonogai et al. |

FOREIGN PATENT DOCUMENTS

| | | |
|---|---|---|
| EP | 1 816 112 | 8/2007 |
| JP | 60-239352 | 11/1985 |
| JP | 63-176359 | 7/1988 |
| JP | 4-145693 | 5/1992 |
| JP | 6-325971 | 11/1994 |
| JP | 8-26832 | 1/1996 |
| JP | 8-048567 | 2/1996 |
| JP | 10-67567 | 3/1998 |
| JP | 2002-104878 | 4/2002 |
| JP | 2002-348178 | 12/2002 |
| JP | 2005-139034 | 6/2005 |
| WO | 2004/101465 | 11/2004 |
| WO | 2010/113628 | 10/2010 |

OTHER PUBLICATIONS

Supplementary European Search Report dated Jun. 26, 2012 in EP Application No. 10758404.7.
Z. Jingxian et al., "Binary Solvent Mixture for Tape Casting of $TiO_2$ Sheets", Journal of the European Ceramic Society, vol. 24, No. 1, pp. 147-155, Jan. 1, 2004.
C. Cho et al., "Effects of PVB on the Gelation Behavior of $BaTiO_3$-based Dielectric Particles and Glass Suspension", Journal of the European Ceramic Society, vol. 23, No. 13, pp. 2315-2322, Dec. 1, 2003.

(Continued)

*Primary Examiner* — David W Wu
*Assistant Examiner* — Marie Reddick
(74) *Attorney, Agent, or Firm* — Wenderoth, Lind & Ponack, L.L.P.

(57) ABSTRACT

The present invention provides a method for producing a slurry composition which realizes excellent dispersibility through simple steps. In addition, the present invention provides a slurry composition produced using this method.

The present invention provides a method for producing a slurry composition containing inorganic powder, a polyvinyl acetal resin, and an organic solvent, the method comprising the steps of: mixing inorganic powder, a polyvinyl acetal resin (A) and an organic solvent for inorganic dispersion to prepare an inorganic dispersion; mixing a polyvinyl acetal resin (B) and an organic solvent for resin solution to prepare a resin solution; and adding the resin solution to the inorganic dispersion, the polyvinyl acetal resin (A) having a polymerization degree of 200 to 600, the polyvinyl acetal resin (B) having a polymerization degree of 800 to 4000, and an amount of the polyvinyl acetal resin (A) used in preparation of the inorganic dispersion being 0.1 to 20 parts by weight relative to 100 parts by weight of the inorganic powder.

3 Claims, 1 Drawing Sheet

(56) References Cited

OTHER PUBLICATIONS

International Search Report issued Jun. 29, 2010 in International (PCT) Application No. PCT/JP2010/054380.
Office Action issued Dec. 2, 2013 in counterpart European Application No. 10 758 404.7.
International Search Report issued Dec. 13, 2011 in International (PCT) Application No. PCT/JP2011/071213.
Supplementary European Search Report issued May 22, 2014 in European Application No. 11828833.1.

* cited by examiner

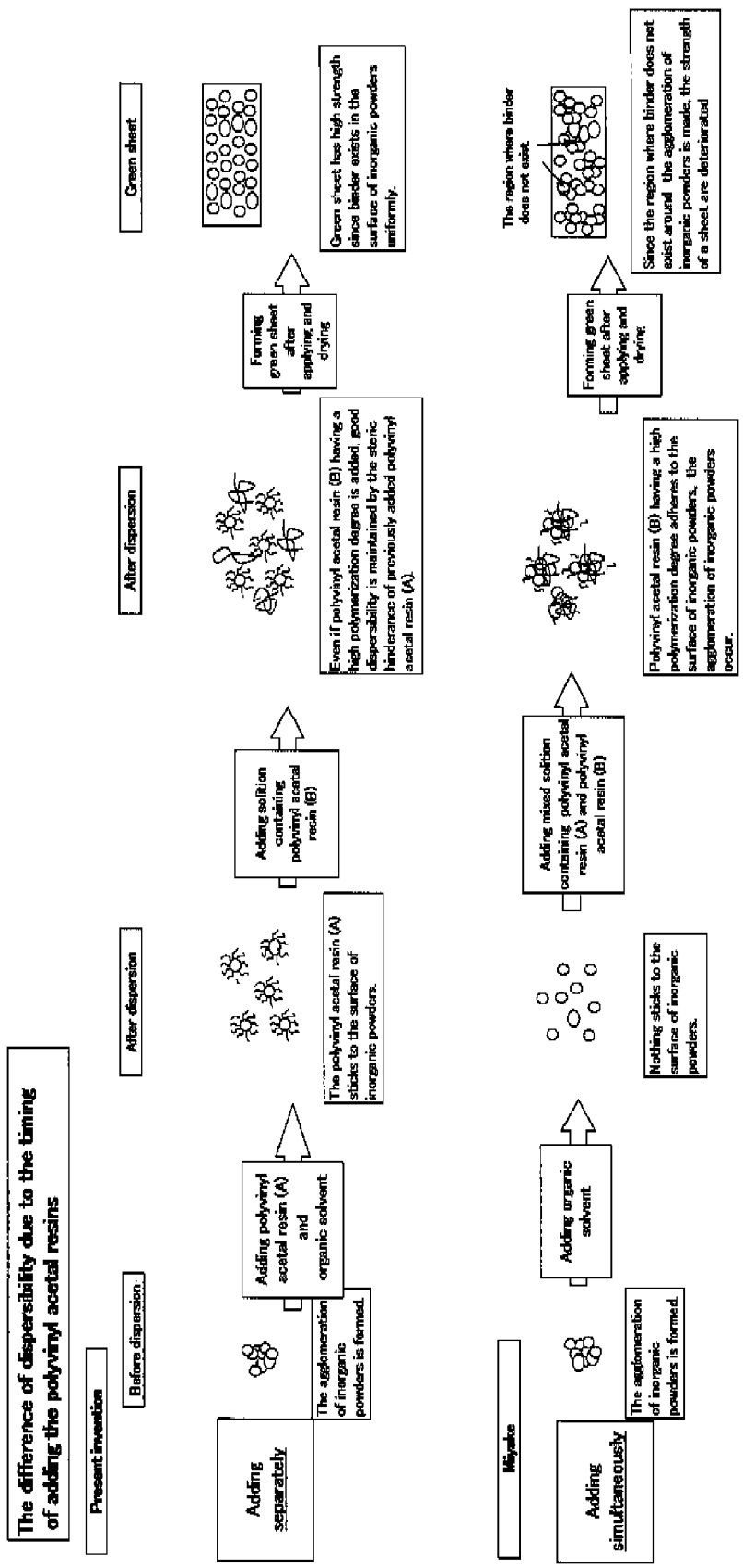

METHOD FOR PRODUCING SLURRY COMPOSITION

This application is a U.S. national stage of International Application No. PCT/JP2010/054380 filed Mar. 16, 2010.

TECHNICAL FIELD

The present invention relates to a method for producing a slurry composition which realizes excellent dispersibility through simple steps. In addition, the present invention also relates to a slurry composition produced using this method.

BACKGROUND ART

Polyvinyl acetal resins are excellent in toughness, film formation properties, properties for dispersing inorganic or organic powder such as pigments therein, and adhesiveness to the coated surface. Therefore, they are suitably used in, for example, ceramic green sheets and conductive pastes used for constituting multilayer ceramic capacitors, ink, paints, baking enamels, and wash primers.

Particularly, multilayer ceramic capacitors are normally produced through the following steps.

First, ceramic material powder is added to a binder resin such as a polyvinyl butyral resin, and they are uniformly mixed to produce a slurry composition. The slurry composition is applied to a surface of a base subjected to releasing treatment in advance. The applied slurry composition is heated so that volatiles such as solvents therein are removed, and then peeled from the base to produce a ceramic green sheet. Then, a conductive paste containing ethyl cellulose, a polyvinyl butyral resin or the like as a binder resin is applied to the obtained ceramic green sheet by screen printing. A plurality of such sheets are alternately laminated and thermocompressed to each other. The obtained lamination is degreased and fired to produce a ceramic fired body. On end faces of the ceramic fired body, external electrodes are sintered. In this manner, multilayer ceramic capacitors are produced.

Recent needs for downsized multilayer ceramic capacitors with higher capacity lead to studies to achieve further increase in the number of layers and further reduction in film thickness. In such multilayer ceramic capacitors, ceramic green sheets have become thinner and thinner. Along with this, ceramic powder to be used is required to have a smaller particle size.

A common method for dispersing ceramic powder and the like in a slurry composition, as disclosed in Patent Document 1, comprises the following steps. An inorganic dispersion comprising inorganic powder and an organic solvent is prepared. Separately, a resin solution comprising a binder resin dissolved therein is prepared. Then, the inorganic dispersion and the resin solution are mixed.

However, this method requires stirring of a liquid mixture for a long time to avoid insufficient dispersion of ceramic powder. Such stirring problematically consumes excessive energy and time.

Further, a method for ensuring the dispersibility of ceramic powder in the slurry composition include, as disclosed in Patent Document 2, a method of adding a dispersant. However, in a case where the used dispersant has poor compatibility with the binder resin, this method may adversely affect the dispersibility or lower the dispersibility during long storage.

PRIOR ART DOCUMENTS

Patent Documents

Patent Document 1: Japanese Kokai Publication No. 2005-139034 (JP-A 2005-139034)
Patent Document 2: Japanese Kokai Publication No. Hei-06-325971 (JP-A H06-325971)

SUMMARY OF THE INVENTION

Problems to be Solved by the Invention

The present invention was made in view of the above-mentioned state of the art, and an object thereof is to provide a method for producing a slurry composition which realizes excellent dispersibility through simple steps. In addition, another object of the present invention is to provide a slurry composition produced using this method.

Means for Solving the Problems

The present invention provides a method for producing a slurry composition containing inorganic powder, a polyvinyl acetal resin, and an organic solvent, the method comprising the steps of: mixing inorganic powder, a polyvinyl acetal resin (A) and an organic solvent for inorganic dispersion to prepare an inorganic dispersion; mixing a polyvinyl acetal resin (B) and an organic solvent for resin solution to prepare a resin solution; and adding the resin solution to the inorganic dispersion, the polyvinyl acetal resin (A) having a polymerization degree of 200 to 600, the polyvinyl acetal resin (B) having a polymerization degree of 800 to 4000, and an amount of the polyvinyl acetal resin (A) used in preparation of the inorganic dispersion being 0.1 to 20 parts by weight relative to 100 parts by weight of the inorganic powder.

In the following, the present invention is described in detail.

The present inventors made various investigations to find out the following. Use of a polyvinyl acetal resin as a dispersant in a method for producing a slurry composition significantly enhances the dispersibility of inorganic powder and enables production of a slurry composition which provides a film with excellent strength. Here, the method comprises the steps of: preparing an inorganic dispersion comprising inorganic powder, an organic solvent for inorganic dispersion, and a dispersant; preparing a resin solution comprising a binder resin dissolved therein; and mixing the inorganic dispersion and the resin solution. Accordingly, the present invention was completed.

In the present invention, the method comprises the steps of: mixing inorganic powder, a polyvinyl acetal resin (A) and an organic solvent for inorganic dispersion to prepare an inorganic dispersion; mixing a polyvinyl acetal resin (B) and an organic solvent for resin solution to prepare a resin solution; and adding the resin solution to the inorganic dispersion.

In the present invention, a polyvinyl acetal resin (A) is used as a dispersant in preparation of the inorganic dispersion. Use of a polyvinyl acetal resin (A) as a dispersant in preparation of the inorganic dispersion allows adhesion of the polyvinyl acetal resin (A) on the surface of inorganic powder. As a result, the dispersibility of the inorganic powder is enhanced. Subsequent addition of a resin solution containing a polyvinyl acetal resin (B) to the inorganic dispersion enhances the strength of a sheet obtainable when the resulting composition is formed into a green sheet, for example, without deteriorating the dispersibility of the inorganic powder.

In preparation of the inorganic dispersion, it is preferable to dissolve the polyvinyl acetal resin (A) in an organic solvent for inorganic dispersion prior to the addition of inorganic powder.

In preparation of the inorganic dispersion in the present invention, a polyvinyl acetal resin (A) is used as a dispersant. Use of a polyvinyl acetal resin (A) which is of the same kind as the binder resin, as a dispersant, eliminates the conventional need to consider the adverse effect caused by the added dispersant.

In the present description, the polyvinyl acetal resin (A) and the polyvinyl acetal resin (B) described below are simply referred to as polyvinyl acetal resins if no distinction is needed between them.

With respect to the polymerization degree of the polyvinyl acetal resin (A), the lower limit is 200 and the upper limit is 600. A polyvinyl acetal resin (A) having a polymerization degree of less than 200 is hardly commercially available, and therefore, it is impractical to use such a resin. A polyvinyl acetal resin (A) having a polymerization degree of more than 600 hardly allows occurrence of sufficient dispersion because of its too-high cohesion. Preferably, the lower limit is 300 and the upper limit is 500.

With respect to the amount of a hydroxyl group in the polyvinyl acetal resin (A), the preferable lower limit is 28 mol % and the preferable upper limit is 60 mol %. A polyvinyl acetal resin (A) having an amount of less than 28 mol % of a hydroxyl group is less likely to adhere to the surface of inorganic powder, failing to enhance the dispersibility. A polyvinyl acetal resin (A) having an amount of more than 60 mol % of a hydroxyl group is hardly synthesized and may have lowered solubility in solvents. More preferably, the lower limit is 35 mol % and the upper limit is 55 mol %. Still more preferably, the lower limit is 40 mol % and the upper limit is 50 mol %.

The polyvinyl acetal resin (A) preferably comprises an anionic group.

The polyvinyl acetal resin (A) comprising the anionic group is more likely to adhere to the surface of inorganic powder to enhance the dispersibility of the inorganic powder.

The anionic group is not particularly limited, provided that it is an anionic modifying group. Examples thereof include a carboxyl group, a sulfonate group, and a phosphate group.

With respect to the modification degree with the anionic group, the lower limit is preferably 0.1 mol % and the upper limit is preferably 2 mol %.

In a case where the modification degree with the anionic group is less than 0.1 mol %, the polyvinyl acetal resin (A) is less likely to adhere to the surface of inorganic powder, failing to enhance the dispersibility. In a case where the modification degree with the anionic group is more than 2 mol %, the polyvinyl acetal resin (A) is less likely to adhere to the surface of inorganic powder because of attractive interaction between molecules of the polyvinyl acetal resin (A). More preferably, the lower limit is 0.2 mol % and the upper limit is 1 mol %.

The modification degree is obtained through a procedure comprising the steps of: dissolving a modified polyvinyl acetal resin in DMSO-$d_6$ (dimethylsulfoxide); measuring $^{13}$C-NMR spectrum thereof; and calculating the modification degree based on the peak area derived from a methine group coupling with a carboxyl group and the peak area derived from a methine group in a portion acetalized.

In the polyvinyl acetal resin (A), the ratio between a portion acetalized by acetaldehyde and a portion acetalized by butyl aldehyde is preferably 20/80 to 70/30. In the portion acetalized by acetaldehyde, the length of a hydrocarbon group derived from aldehyde is shorter. This lowers the steric hindrance to allow easier adhesion of hydroxyl groups to inorganic powder. Accordingly, the above ratio of not less than 20/80 enhances the dispersibility of inorganic powder. In contrast, in a case where the proportion of the portion acetalized by acetaldehyde is too large, the solubility in an organic solvent for inorganic dispersion may be lowered and an obtainable sheet after molding and drying may be so hard that cracks are more likely to occur. Accordingly, the above ratio is preferably not more than 70/30. More preferably, the above ratio is 30/70 to 60/40.

The inorganic powder is not particularly limited and examples thereof include metal powder, conductive powder, ceramic powder, and glass powder.

In a case where conductive powder is used as the inorganic powder, the slurry composition may be used as a conductive paste.

The conductive powder is not particularly limited, provided that the powder shows sufficient conductivity. Examples thereof include powder comprising nickel, palladium, platinum, gold, silver, copper, or alloys of these. Each kind of the conductive powder may be used alone, or two or more kinds may be used in combination.

In a case where ceramic powder is used as the inorganic powder, the slurry composition may be used as a ceramic paste. The ceramic powder is not particularly limited and examples thereof include powder comprising alumina, zirconia, aluminum silicate, titanium oxide, zinc oxide, barium titanate, magnesia, sialon, spinel mullite, silicon carbide, silicon nitride, or aluminum nitride. Particularly, the ceramic powder preferably comprises the same component as the ceramic powder contained in the ceramic green sheet to be used. Each kind of the ceramic powder may be used alone, or two or more kinds may be used in combination.

In a case where glass powder is used as the inorganic powder, the slurry composition may be used as a glass paste. The glass powder is not particularly limited and examples thereof include lead oxide-boron oxide-silicon oxide-calcium oxide glass, zinc oxide-boron oxide-silicon oxide glass, and lead oxide-zinc oxide-boron oxide-silicon oxide glass. Each kind of the glass powder may be used alone, or two or more kinds may be used in combination. Further, aluminum oxide and the like may be used in combination, to the extent that the object of the present invention is not impaired.

In a case where magnetic powder is used as the inorganic powder, the slurry composition may be used as a magnetic material paste. The magnetic powder is not particularly limited and examples thereof include ferrites such as manganese zinc ferrite, nickel zinc ferrite, copper zinc ferrite, barium ferrite, and strontium ferrite, metal oxides such as chrome oxide, metallic magnetics such as cobalt, and amorphous magnetics. Each kind of the magnetic powder may be used alone, or two or more kinds may be used in combination.

With respect to the amount of the polyvinyl acetal resin (A) added in preparation of the inorganic dispersion, the lower limit is 0.1 parts by weight and the upper limit is 20 parts by weight, relative to 100 parts by weight of the inorganic powder. An amount of less than 0.1 parts by weight may cause insufficient dispersibility of the inorganic powder, for example. In contrast, an amount of more than 20 parts by weight may cause too-high viscosity of the inorganic dispersion which leads to the poor handleability thereof. Preferably, the lower limit is 0.6 parts by weight and the upper limit is 15 parts by weight. More preferably, the lower limit is one part by weight and the upper limit is 10 parts by weight. Particularly, 0.6 parts by weight or more of the polyvinyl acetal resin (A) allows sufficient adhesion thereof to the surface of the inorganic powder, and therefore, the inorganic powder in the ceramic slurry is allowed to be more finely dispersed.

In the present invention, the subsequent step is mixing of a polyvinyl acetal resin (B) and an organic solvent for resin solution to prepare a resin solution.

With respect to the polymerization degree of the polyvinyl acetal resin (B), the lower limit is 800 and the upper limit is 4000. A polyvinyl acetal resin (B) having a polymerization degree of lower than 800 causes insufficient sheet strength when used in a green sheet. In contrast, a polyvinyl acetal resin (B) having a polymerization degree of more than 4000 makes the viscosity of the slurry composition too high, resulting in the lowered coating property of the slurry composition. Preferably, the lower limit is 1200 and the upper limit is 3500.

With respect to the amount of a hydroxyl group in the polyvinyl acetal resin (B), the lower limit is preferably 22 mol % and the upper limit is preferably 42 mol %. An amount of less than 22 mol % of a hydroxyl group may cause insufficient sheet strength when a slurry containing the polyvinyl acetal resin (B) is used in producing a green sheet. An amount of more than 42 mol % of a hydroxyl group may cause aggregation of inorganic powder particles. More preferably, the lower limit is 28 mol % and the upper limit is 40 mol %.

With respect to the amount of the polyvinyl acetal resin (B) added in preparation of the resin solution, the lower limit is preferably 5 parts by weight and the upper limit is preferably 20 parts by weight, relative to 100 parts by weight of the inorganic powder. An amount of less than 5 parts by weight may cause insufficient dispersibility of the inorganic powder and insufficient strength, flexibility and adhesiveness of a dried film, for example. An amount of more than 20 parts by weight may cause too-high viscosity or a lowered coating property, resulting in poor handleability of the resin solution.

In producing a thin-layer ceramic green sheet which especially requires high strength, mixing of the polyvinyl acetal resin (B) with a high polymerization degree and the polyvinyl acetal resin (A) with a low polymerization degree allows production of a ceramic green sheet having sufficient dispersibility and sheet strength.

The polyvinyl acetal resins are obtainable by acetalizing polyvinyl alcohols with aldehydes.

The polyvinyl alcohols are obtainable by, for example, saponifying copolymers of vinyl esters and ethylene. Examples of the vinyl esters include vinyl formate, vinyl acetate, vinyl propionate, and vinyl pivalate. Among these, vinyl acetate is preferable from an economic perspective.

The polyvinyl alcohols may be obtainable by copolymerization using ethylenically unsaturated monomers to the extent that the effects of the present invention are not impaired. The ethylenically unsaturated monomers are not particularly limited and examples thereof include acrylic acid, methacrylic acid, (anhydrous) phthalic acid, (anhydrous) maleic acid, (anhydrous) itaconic acid, acrylonitrile, methacrylonirile, acrylamide, methacrylamide, trimethyl-(3-acrylamide-3-dimethylpropyl)-ammonium chloride, acrylamide-2-methylpropanesulfonic acid, and sodium salts of these, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate, and sodium allylsulfonate. Additionally, terminal-modified polyvinyl alcohols may also be used, which are obtainable by copolymerizing vinyl ester monomers such as vinyl acetate and ethylene in the presence of thiol compounds such as thiol acetate and mercaptopropionate and saponifying the resulting copolymers.

The polyvinyl alcohols may be prepared by copolymerizing the vinyl esters and α-olefins and saponifying the resulting copolymers. The polyvinyl alcohols may be further obtainable by copolymerization using the ethylenically unsaturated monomers to contain a component derived from the ethylenically unsaturated monomers. Further, terminal-modified polyvinyl alcohols may be used, which is obtainable by copolymerizing vinyl ester monomers such as vinyl acetate and α-olefins in the presence of thiol compounds such as thiol acetate and mercaptopropionate and saponifying the resulting copolymers. The α-olefins are not particularly limited and examples thereof include methylene, ethylene, propylene, isopropylene, butylene, isobutylene, pentylene, hexylene, cyclohexylene, cyclohexyl ethylene, and cyclohexyl propylene.

The polyvinyl acetal resins preferably have an acetalization degree of 40 to 80 mol %. Polyvinyl acetal resins with an acetalization degree of less than 40 mol % have a lowered solubility in organic solvents, failing to be suitably used in slurry compositions. Polyvinyl acetal resins with an acetalization degree of more than 80 mol % are less likely to be produced on an industrial scale. Preferably, the acetalization degree is 50 to 80 mol %.

In the present description, the acetalization degree refers to the proportion of the number of hydroxyl groups acetalized by butyl aldehyde in the number of hydroxyl groups of the polyvinyl alcohol. Since an acetal group in the polyvinyl acetal resin is formed by two acetalized hydroxyl groups, the acetalization degree in mol % is calculated by counting the two acetalized hydroxyl groups.

The subsequent step in the present invention is adding the resin solution to the inorganic dispersion.

In this manner, a slurry composition is prepared.

In the method for producing a slurry composition of the present invention, other resins such as polyvinyl acetal resins other than the above-mentioned polyvinyl acetal resins, acrylic resins, and ethyl cellulose may be used, to the extent that the effects of the present invention are not impaired. However, the amount of the above-mentioned polyvinyl acetal resins needs to be not less than 50% by weight in the total amount of all binder resins.

The organic solvent for inorganic dispersion and the organic solvent for resin solution are not particularly limited and organic solvents commonly used in slurry compositions may be used. Examples thereof include: ketones such as acetone, methyl ethyl ketone, dipropyl ketone, and diisobutyl ketone; alcohols such as methanol, ethanol, isopropanol, and butanol; aromatic hydrocarbons such as toluene and xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate; and terpineols such as terpineol, dihydroterpineol, terpineol acetate, and dihydroterpineol acetate, and their derivatives. Each of these organic solvents may be used alone, or two or more of these may be used in combination.

In particular, a mixed solvent comprising ethanol and toluene are preferably used as the organic solvent for inorganic dispersion and the organic solvent for resin solution. Use of this mixed solvent significantly enhances the dispersibility of the obtainable slurry composition. Since ethanol prevents aggregation of the polyvinyl acetal resin (B) and toluene accelerates adhesion of the polyvinyl acetal resin (A) to the surface of the inorganic powder, the synergy effect of these presumably leads to the significant enhancement of the dispersibility of the slurry composition.

The mixing ratio of ethanol and toluene in the case of using the mixed solvent is preferably 5:5 to 2:8. The mixing ratio within this range significantly enhances the dispersibility of the slurry composition.

With respect to the amount of the organic solvent for inorganic dispersion to be added in preparation of the inorganic dispersion, the lower limit is preferably 20 parts by weight and the upper limit is preferably 60 parts by weight, relative to 100 parts by weight of inorganic powder. An amount of less than 20 parts by weight increases the viscosity of the obtainable dispersion. This may limit the movement of ceramic powder, leading to a failure in obtaining sufficient dispersibility. An amount of more than 60 parts by weight lowers the concentration of the ceramic powder in the dispersion. This may reduce the number of collisions between the ceramic powder particles, leading to a failure in obtaining sufficient dispersibility.

With respect to the amount of the organic solvent for resin solution to be added in preparation of the resin solution, the lower limit is preferably 70 parts by weight and the upper limit is preferably 130 parts by weight, relative to 100 parts by weight of inorganic powder. An amount of less than 70 parts by weight may make it difficult to obtain the desired viscosity, leading to poor coating property. An amount of more than 130 parts by weight lowers the concentration of the ceramic powder, which may make an obtainable dried sheet nonuniform.

In the method for producing a slurry composition of the present invention, a plasticizer, a lubricant, an antistatic agent and the like may be appropriately added, to the extent that the effects of the present invention are not impaired.

The method for producing a slurry composition of the present invention allows excellently high dispersibility and produces a slurry composition which gives a film with excellent strength. The present invention also provides such a slurry composition.

Effect of the Invention

The present invention provides a method for producing a slurry composition which realizes excellent dispersibility through simple steps. The present invention also provides a slurry composition produced using this method.

MODES FOR CARRYING OUT THE INVENTION

Hereinafter, the present invention will be described in more detail by way of examples, but the present invention is not limited to these examples.

Synthesis of Polyvinyl Acetal Resins (A) [(A1) to (A11)]

An amount of 350 parts by weight of polyvinyl alcohol with a polymerization degree of 320 and saponification degree of 99 mol % was added to 3000 parts by weight of pure water. The mixture was stirred at 90° C. for about two hours so that the polyvinyl alcohol was dissolved. The obtained solution was cooled to 40° C. To the solution, 230 parts by weight of hydrochloric acid having a concentration of 35% by weight and 150 parts by weight of n-butyl aldehyde were added. The solution was further cooled to 1° C. and maintained at that temperature while being subjected to acetalization so that reaction products were precipitated. Subsequently, the solution temperature was maintained at 20° C. for three hours so that the reaction was completed. Then, the solution was neutralized, rinsed, and dried by a common method. Consequently, a polyvinyl acetal resin (A1) in the form of white powder was obtained. The obtained polyvinyl acetal resin was dissolved in DMSO-$d_6$ (dimethylsulfoxide) and the butyralization degree was measured using $^{13}$C-NMR (nuclear magnetic resonance spectrum). The obtained degree of butyralization was 51 mol %.

Polyvinyl acetal resins (A2) to (A11) were synthesized in the same manner as the polyvinyl acetal resin (A1), except that conditions shown in Table 1 were satisfied.

TABLE 1

Conditions for producing polyvinyl acetal resins (A)

| | Polyvinyl alcohol | | | | Amount of n-butyl aldehyde (Parts by weight) | Amount of hydrochloric acid (35% in concentration) (Parts by weight) | Input temperature of n-butyl aldehyde (° C.) |
|---|---|---|---|---|---|---|---|
| Name | Polymerization degree | Saponification degree (mol %) | Modification degree (mol %) | Amount (Parts by weight) | | | |
| A1 | 320 | 99 | — | 350 | 3000 | 150 | 230 | 1 |
| A2 | 320 | 99 | — | 350 | 3000 | 135 | 230 | 1 |
| A3 | 360 | 99 | — | 350 | 3000 | 210 | 400 | 1 |
| A4 | 320 | 99 | — | 350 | 3000 | 210 | 400 | 1 |
| A5 | 320 | 99 | — | 350 | 3000 | 195 | 230 | 1 |
| A6 | 320 | 99 | — | 350 | 3000 | 185 | 230 | 1 |
| A7 | 230 | 99 | — | 350 | 3000 | 205 | 200 | 0 |
| A8 | 450 | 86 | 0.6 | 350 | 3000 | 170 | 200 | 2 |
| A9 | 500 | 99 | — | 350 | 3000 | 150 | 230 | 2 |
| A10 | 600 | 87 | — | 350 | 3000 | 170 | 200 | 3 |
| A11 | 1000 | 99 | — | 350 | 3000 | 150 | 230 | 1 |

TABLE 1-continued

| | Conditions for producing polyvinyl acetal resins (A) | | Polyvinyl acetal resins (A) | | | |
|---|---|---|---|---|---|---|
| Name | Maintained temperature after precipitation (° C.) | Maintained time after precipitation (hours) | Amount of hydroxyl group (mol %) | Acetalization degree (mol %) | Amount of acetyl group (mol %) | Anionic modification degree (mol %) |
| A1 | 20 | 3 | 48 | 51 | 1 | — |
| A2 | 20 | 3 | 57 | 42 | 1 | — |
| A3 | 20 | 3 | 23 | 74 | 3 | — |
| A4 | 20 | 3 | 23.5 | 74 | 2.5 | — |
| A5 | 20 | 3 | 32 | 67 | 1 | — |
| A6 | 20 | 3 | 35 | 64 | 1 | — |
| A7 | 20 | 3 | 28.5 | 70.5 | 1 | — |
| A8 | 35 | 3 | 29 | 56.4 | 14 | 0.6 |
| A9 | 35 | 3 | 48 | 51 | 1 | — |
| A10 | 20 | 3 | 29 | 58 | 13 | — |
| A11 | 40 | 3 | 48 | 51 | 1 | — |

Synthesis of Polyvinyl Acetal Resins (B) [(B1) to (B6)]

An amount of 280 parts by weight of polyvinyl alcohol with a polymerization degree of 1700 and saponification degree of 99 mol % was added to 3000 parts by weight of pure water. The mixture was stirred at 90° C. for about two hours so that the polyvinyl alcohol was dissolved. The obtained solution was cooled to 40° C. To the solution, 200 parts by weight of hydrochloric acid having a concentration of 35% by weight and 155 parts by weight of n-butyl aldehyde were added. The solution was further cooled to 1° C. and maintained at that temperature while being subjected to acetalization so that reaction products were precipitated. Subsequently, the solution temperature was maintained at 40° C. for three hours so that the reaction was completed. Then, the solution was neutralized, rinsed, and dried by a common method. Consequently, a polyvinyl acetal resin (B1) in the form of white powder was obtained. The obtained polyvinyl acetal resin was dissolved in DMSO-$d_6$ (dimethylsulfoxide) and the butyralization degree was measured using a $^{13}$C-NMR (nuclear magnetic resonance spectrum). The obtained degree of butyralization was 66 mol %.

Polyvinyl acetal resins (B2) to (B6) were synthesized in the same manner as the polyvinyl acetal resin (B1), except that conditions shown in Table 2 were satisfied.

TABLE 2

| | Conditions for producing polyvinyl acetal resins (B) | | | | | |
|---|---|---|---|---|---|---|
| | Polyvinyl alcohol | | Amount of water (Parts by weight) | Amount of n-butyl aldehyde (Parts by weight) | Amount of hydrochloric acid (35% in concentration) (Parts by weight) | Input temperature of n-butyl aldehyde (° C.) |
| Name | Polymerization degree | Saponification degree (mol %) | | | | |
| B1 | 1700 | 99 | 280 | 3000 | 155 | 200 | 10 |
| B2 | 850 | 99 | 310 | 3000 | 170 | 200 | 10 |
| B3 | 3000 | 99 | 220 | 3000 | 120 | 230 | 10 |
| B4 | 1700 | 99 | 280 | 3000 | 138 | 270 | 10 |
| B5 | 2000 | 99 | 280 | 3000 | 150 | 200 | 10 |
| B6 | 4100 | 99 | 220 | 3000 | 120 | 220 | 10 |

| | Conditions for producing polyvinyl acetal resins (B) | | Polyvinyl acetal resins (B) | | | |
|---|---|---|---|---|---|---|
| Name | Maintained temperature after precipitation (° C.) | Maintained time after precipitation (hours) | Polymerization degree | Amount of hydroxyl group (mol %) | Acetalization degree (mol %) | Amount of acetyl group (mol %) |
| B1 | 40 | 3 | 1700 | 33 | 66 | 1 |
| B2 | 40 | 3 | 850 | 33 | 66 | 1 |
| B3 | 35 | 3 | 3000 | 33 | 66 | 1 |
| B4 | 40 | 3 | 1700 | 41 | 58 | 1 |
| B5 | 40 | 3 | 2000 | 35 | 64 | 1 |
| B6 | 40 | 3 | 4100 | 33 | 66 | 1 |

EXAMPLE 1

Preparation of Inorganic Dispersion

An amount of one part by weight of the obtained polyvinyl acetal resin (A1) was added to a mixed solvent comprising 20 parts by weight of toluene and 20 parts by weight of ethanol and stirred to be dissolved therein. Subsequently, 100 parts by weight of barium titanate powder (product of SAKAI CHEMICAL INDUSTRY CO., LTD., BT02) was added to the obtained solution. The mixture was stirred by a bead mill (product of AIMEX CO., Ltd., Ready Mill) for 180 minutes to produce an inorganic dispersion.

(Preparation of Resin Solution)

An amount of 8 parts by weight of the obtained polyvinyl acetal resin (B1) and 2 parts by weight of DOP were added to a mixed solvent comprising 45 parts by weight of ethanol and 45 parts by weight of toluene. The mixture was stirred so that the added components were dissolved. In this manner, a resin solution was prepared.

(Preparation of Slurry Composition)

The resin solution was added to the inorganic dispersion and the mixture was stirred by a bead mill for 90 minutes to produce a slurry composition.

EXAMPLES 2 TO 20

Slurry compositions were prepared in the same manner as in Example 1, except that the polyvinyl acetal resins (A), the polyvinyl acetal resins (B), and organic solvents shown in Table 3 were used.

EXAMPLES 21 TO 23

Slurry compositions were prepared in the same manner as in Example 1, except that aluminum nitride powder, instead of barium titanate, was used as inorganic powder and the polyvinyl acetal resins (A), the polyvinyl acetal resins (B), and organic solvents shown in Table 3 were used.

EXAMPLES 24 TO 26

Slurry compositions were prepared in the same manner as in Example 1, except that Ni=Zn ferrite powder, instead of barium titanate, was used as inorganic powder and the polyvinyl acetal resins (A), the polyvinyl acetal resins (B), and organic solvents shown in Table 3 were used.

COMPARATIVE EXAMPLES 1 TO 4

Slurry compositions were prepared in the same manner as in Example 1, except that the polyvinyl acetal resins (A) were not added and the polyvinyl acetal resins (B) and organic solvents shown in Table 4 were used.

COMPARATIVE EXAMPLE 5

A slurry composition was prepared in the same manner as in Example 1, except that the polyvinyl acetal resin (A) was not added to the inorganic dispersion but dissolved in the resin solution along with the polyvinyl acetal resin (B) as shown in Table 4.

COMPARATIVE EXAMPLE 6

A slurry composition was prepared in the same manner as in Example 1, except that the polyvinyl acetal resin (B) shown in Table 4 was used.

COMPARATIVE EXAMPLE 7

A slurry composition was prepared in the same manner as in Example 1, except that the amount of the polyvinyl acetal resin (A) was changed to the amount shown in Table 4.

COMPARATIVE EXAMPLE 8

A slurry composition was prepared in the same manner as in Example 1, except that the polyvinyl acetal resin (A) shown in Table 4 was used.

COMPARATIVE EXAMPLE 9

A slurry composition was prepared in the same manner as in Example 1, except that "Hypermer KD-2" (product of Croda Inc., polyamine compound with a hydrocarbon grafted on a side chain) was used instead of the polyvinyl acetal resin (A).

COMPARATIVE EXAMPLE 10

A slurry composition was prepared in the same manner as in Example 1, except that aluminum nitride powder, instead of the barium titanate, was used as inorganic powder, the polyvinyl acetal resin (A) was not added, and the polyvinyl acetal resin (B) and an organic solvent shown in Table 4 were used.

COMPARATIVE EXAMPLE 11

A slurry composition was prepared in the same manner as in Example 1, except that Ni=Zn ferrite powder, instead of barium titanate, was used as inorganic powder, the polyvinyl acetal resin (A) was not added, and the polyvinyl acetal resin (B) and an organic solvent shown in Table 4 were used.

Evaluation

The obtained slurry compositions were evaluated with respect to the following items.

(1) Evaluation of Green sheet

Production of Green Sheet

The obtained slurry compositions were applied on polyethylene terephthalate (PET) films subjected to releasing treatment in advance, in a manner that the thicknesses of the dried films become 20 µm, and dried. In this manner, ceramic green sheets were produced.

(1-1) Surface Roughness

The surface roughnesses Ra of the obtained ceramic green sheets were measured based on JIS B 0601 (1994). In this manner, the surface roughness of the ceramic slurries was evaluated. Normally, the higher the dispersibility of a slurry composition is, the smaller the surface roughness of the ceramic green sheet is.

(1-2) Tensile Modulus of Elasticity

Measurement of the tensile modulus of elasticity (MPa) was carried out using TENSILON (product of Shimadzu Corporation, AUTOGRAPH AGS-J) at a pulling speed of 20 mm/min., according to JIS K 7113.

(2) Evaluation on Dispersibility
(Preparation of Solution for Evaluating Dispersibility)

An amount of 0.1 parts by weight of each obtained slurry composition was added to a mixed solvent comprising 5 parts by weight of ethanol and 5 parts by weight of toluene. The mixture was stirred by an ultrasonic disperser (product of SND Co., Ltd., US-303) for 10 minutes to produce a solution for evaluating dispersibility.

(Evaluation on Dispersibility)

Measurement of particle size distribution was carried out using a laser diffraction particle size analyzer (product of HORIBA Ltd., LA-910), with respect to the obtained solutions for evaluating dispersibility. The peak position of the maximum particle size and the average particle size were obtained.

TABLE 3

|  | Inorganic dispersion | | | | Resin solution | | | | |
|---|---|---|---|---|---|---|---|---|---|
|  |  | Polyvinyl acetal resin (A) | | Organic solvent | | Polyvinyl acetal resin (B) | | Organic solvent | Amount of plasticizer |
|  | Inorganic powder | Type | Amount (Parts by weight) | Ethanol: Toluene | Amount (Parts by weight) | Type | Amount (Parts by weight) | Ethanol: Toluene | Amount (Parts by weight) | (DOP) (Parts by weight) |
| Example 1 | Barium titanate | A1 | 1 | 5:5 | 40 | B1 | 8 | 5:5 | 90 | 2 |
| Example 2 | Barium titanate | A1 | 2 | 5:5 | 40 | B1 | 8 | 5:5 | 90 | 2 |
| Example 3 | Barium titanate | A1 | 10 | 5:5 | 40 | B1 | 8 | 5:5 | 90 | 2 |
| Example 4 | Barium titanate | A1 | 0.7 | 5:5 | 40 | B1 | 8 | 5:5 | 90 | 2 |
| Example 5 | Barium titanate | A1 | 15 | 5:5 | 40 | B1 | 8 | 5:5 | 90 | 2 |
| Example 6 | Barium titanate | A1 | 0.1 | 5:5 | 40 | B1 | 8 | 5:5 | 90 | 2 |
| Example 7 | Barium titanate | A1 | 19 | 5:5 | 40 | B1 | 8 | 5:5 | 90 | 2 |
| Example 8 | Barium titanate | A1 | 1 | 5:5 | 40 | B2 | 8 | 5:5 | 90 | 2 |
| Example 9 | Barium titanate | A1 | 1 | 5:5 | 40 | B3 | 8 | 5:5 | 90 | 2 |
| Example 10 | Barium titanate | A1 | 1 | 5:5 | 40 | B4 | 8 | 5:5 | 90 | 2 |
| Example 11 | Barium titanate | A2 | 1 | 5:5 | 40 | B1 | 8 | 5:5 | 90 | 2 |
| Example 12 | Barium titanate | A3 | 1 | 5:5 | 40 | B1 | 8 | 5:5 | 90 | 2 |
| Example 13 | Barium titanate | A4 | 1 | 5:5 | 40 | B1 | 8 | 5:5 | 90 | 2 |
| Example 14 | Barium titanate | A5 | 1 | 5:5 | 40 | B1 | 8 | 5:5 | 90 | 2 |
| Example 15 | Barium titanate | A6 | 1 | 5:5 | 40 | B1 | 8 | 5:5 | 90 | 2 |
| Example 16 | Barium titanate | A6 | 1 | 3:7 | 40 | B1 | 8 | 3:7 | 90 | 2 |
| Example 17 | Barium titanate | A7 | 1 | 5:5 | 40 | B1 | 8 | 5:5 | 90 | 2 |
| Example 18 | Barium titanate | A8 | 1 | 5:5 | 40 | B1 | 8 | 5:5 | 90 | 2 |
| Example 19 | Barium titanate | A9 | 1 | 5:5 | 40 | B1 | 8 | 5:5 | 90 | 2 |
| Example 20 | Barium titanate | A10 | 1 | 5:5 | 40 | B1 | 8 | 5:5 | 90 | 2 |
| Example 21 | Aluminum nitride | A5 | 1 | 5:5 | 40 | B1 | 8 | 5:5 | 90 | 2 |
| Example 22 | Aluminum nitride | A6 | 1 | 5:5 | 40 | B1 | 8 | 5:5 | 90 | 2 |
| Example 23 | Aluminum nitride | A1 | 1 | 5:5 | 40 | B1 | 8 | 5:5 | 90 | 2 |
| Example 24 | Ni—Zn ferrite | A5 | 1 | 5:5 | 40 | B1 | 8 | 5:5 | 90 | 2 |
| Example 25 | Ni—Zn ferrite | A6 | 1 | 5:5 | 40 | B1 | 8 | 5:5 | 90 | 2 |
| Example 26 | Ni—Zn ferrite | A1 | 1 | 5:5 | 40 | B1 | 8 | 5:5 | 90 | 2 |

|  | Evaluation of green sheet | | Evaluation on dispersibility | |
|---|---|---|---|---|
|  | Surface roughness Ra ($\mu$m) | Tensile modulus of elasticity (MPa) | Peak position of the maximum particle size ($\mu$m) | Average size ($\mu$m) |
| Example 1 | 0.010 | 1750 | 0.38 | 0.39 |
| Example 2 | 0.010 | 1800 | 0.39 | 0.35 |
| Example 3 | 0.013 | 1690 | 0.47 | 0.45 |
| Example 4 | 0.015 | 1670 | 0.44 | 0.41 |
| Example 5 | 0.019 | 1660 | 0.49 | 0.49 |
| Example 6 | 0.020 | 1660 | 0.49 | 0.53 |
| Example 7 | 0.019 | 1580 | 0.49 | 0.45 |
| Example 8 | 0.017 | 1400 | 0.39 | 0.47 |
| Example 9 | 0.021 | 1800 | 0.49 | 0.52 |
| Example 10 | 0.018 | 1750 | 0.45 | 0.47 |
| Example 11 | 0.012 | 1700 | 0.43 | 0.43 |
| Example 12 | 0.048 | 1150 | 4.72 | 3.88 |
| Example 13 | 0.045 | 1210 | 4.79 | 3.7 |
| Example 14 | 0.022 | 1550 | 0.58 | 0.53 |
| Example 15 | 0.021 | 1400 | 0.5 | 0.48 |
| Example 16 | 0.022 | 1500 | 0.49 | 0.48 |
| Example 17 | 0.034 | 1380 | 4.47 | 2.81 |
| Example 18 | 0.024 | 1500 | 0.58 | 0.55 |
| Example 19 | 0.011 | 1720 | 0.40 | 0.40 |
| Example 20 | 0.035 | 1260 | 5.12 | 3.49 |
| Example 21 | 0.211 | 1510 | 2.34 | 2.67 |

TABLE 3-continued

| | | | | |
|---|---|---|---|---|
| Example 22 | 0.132 | 1490 | 1.88 | 1.90 |
| Example 23 | 0.122 | 1700 | 1.12 | 1.10 |
| Example 24 | 0.201 | 1620 | 1.45 | 6.52 |
| Example 25 | 0.134 | 1600 | 1.34 | 1.89 |
| Example 26 | 0.111 | 1700 | 1.01 | 1.02 |

TABLE 4

| | | Inorganic dispersion | | | | Resion solution | | | Amount of plasticizer |
|---|---|---|---|---|---|---|---|---|---|
| | | Polyvinyl acetal resin (A) | | Organic solvent | | Polyvinyl acetal resin (B) | | Organic solvent | |
| | Inorganic powder | Type | Amount (Parts by weight) | Ethanol: Toluene | Amount (Parts by weight) | Type | Amount (Parts by weight) | Ethanol: Toluene | Amount (Parts by weight) | (DOP) (Parts by weight) |
| Comparative Example 1 | Barium titanate | Not added | | 3:7 | 40 | B1 | 8 | 3:7 | 90 | 2 |
| Comparative Example 2 | Barium titanate | | | 5:5 | 40 | B1 | 8 | 5:5 | 90 | 2 |
| Comparative Example 3 | Barium titanate | | | 10:0 | 40 | B1 | 8 | 10:0 | 90 | 2 |
| Comparative Example 4 | Barium titanate | | | 5:5 | 40 | B5 | 8 | 5:5 | 90 | 2 |
| Comparative Example 5 | Barium titanate | | | 5:5 | 40 | B1<br>A1 | 8<br>1 | 5:5 | 90 | 2 |
| Comparative Example 6 | Barium titanate | A1 | 1 | 5:5 | 40 | B6 | 8 | 5:5 | 90 | 2 |
| Comparative Example 7 | Barium titanate | A1 | 23 | 5:5 | 40 | B1 | 8 | 5:5 | 90 | 2 |
| Comparative Example 8 | Barium titanate | A11 | 1 | 5:5 | 40 | B1 | 8 | 5:5 | 90 | 2 |
| Comparative Example 9 | Barium titanate | KD-2 | 1 | 5:5 | 40 | B1 | 8 | 5:5 | 90 | 2 |
| Comparative Example 10 | Aluminum nitride | Not added | | 5:5 | 40 | B1 | 8 | 5:5 | 90 | 2 |
| Comparative Example 11 | Ni—Zn ferrite | | | 5:5 | 40 | B1 | 8 | 5:5 | 90 | 2 |

| | Evaluation of green sheet | | Evaluation on dispersibility | |
|---|---|---|---|---|
| | Surface roughness Ra (μm) | Tensile modulus of elasticity (MPa) | Peak position of the maximum particle size (μm) | Average size (μm) |
| Comparative Example 1 | 0.14 | 600 | 15.17 | 35 |
| Comparative Example 2 | 0.13 | 850 | 8.86 | 5.57 |
| Comparative Example 3 | 0.10 | 900 | 5.12 | 2.22 |
| Comparative Example 4 | 0.14 | 870 | 17.3 | 8.4 |
| Comparative Example 5 | 0.12 | 800 | 15.17 | 8.16 |
| Comparative Example 6 | 0.053 | 900 | 8.89 | 8.78 |
| Comparative Example 7 | 0.055 | 900 | 9.48 | 9.57 |
| Comparative Example 8 | 0.071 | 890 | 8.94 | 8.68 |
| Comparative Example 9 | 0.13 | 750 | 174.3 | 12.7 |
| Comparative Example 10 | 0.68 | 790 | 11.43 | 8.98 |
| Comparative Example 11 | 0.82 | 980 | 32.5 | 14.8 |

INDUSTRIAL APPLICABILITY

The present invention provides a method for producing a slurry composition which realizes excellent dispersibility through simple steps. The present invention also provides a slurry composition produced using this method.

The invention claimed is:

1. A method for producing a slurry composition containing inorganic powder, a polyvinyl acetal resin, and an organic solvent, the method comprising the steps of:
    mixing the inorganic powder, a polyvinyl acetal resin (A) and a first organic solvent to prepare an inorganic dispersion;
    mixing a polyvinyl acetal resin (B) and a second organic solvent to prepare a resin solution; and
    adding the resin solution to the inorganic dispersion,
    wherein the polyvinyl acetal resins (A) and (B) are obtained by acetalizing polyvinyl alcohol with butyl aldehyde,
    the polyvinyl acetal resin (A) has a polymerization degree of 200 to 600, an amount of 28 to 60 mol % of a hydroxyl group and an acetalization degree of 40 to 80 mol %,
    the polyvinyl acetal resin (B) has a polymerization degree of 800 to 4000, an amount of 28 to 42 mol % of a hydroxyl group and an acetalization degree of 40 to 80 mol %,
    an amount of the polyvinyl acetal resin (A) used in preparation of the inorganic dispersion is 0.1 to 20 parts by weight relative to 100 parts by weight of the inorganic powder,
    an amount of the polyvinyl acetal resin (B) used in preparation of the resin solution is 5 to 20 parts by weight relative to 100 parts by weight of the inorganic powder,
    the polyvinyl acetal resin (A) is dissolved in the first organic solvent prior to adding the inorganic powder in preparation of the inorganic dispersion, and
    the first organic solvent and the second organic solvent are each independently at least one solvent selected from the group consisting of acetone, methyl ethyl ketone, dipropyl ketone, diisobutyl ketone, methanol, ethanol, isopropanol, butanol, toluene, xylene, methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, 2-ethylhexyl butyrate, terpineol, dihydroterpineol, terpineol acetate, and dihydroterpineol acetate.

2. The method for producing a slurry composition according to claim 1,
    wherein the polyvinyl acetal resin (A) comprises an anionic group.

3. The method for producing a slurry composition according to claim 1,
    wherein the first organic solvent and the second organic solvent are mixed solvents comprising ethanol and toluene.

* * * * *